United States Patent
Jehan et al.

(10) Patent No.: US 10,229,716 B2
(45) Date of Patent: Mar. 12, 2019

(54) METHODS AND SYSTEMS FOR GROUPING PLAYLIST AUDIO ITEMS

(71) Applicant: Spotify AB, Stockholm (SE)

(72) Inventors: Tristan Jehan, Brooklyn, NY (US); Frej Connoly, Stockholm (SE); Miles Lennon, New York, NY (US); Rachel Bittner, Redwood City, CA (US); Mateo Rando, Stockholm (SE); Ulf Karlsson, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 15/399,594

(22) Filed: Jan. 5, 2017

(65) Prior Publication Data
US 2018/0095715 A1   Apr. 5, 2018

Related U.S. Application Data

(60) Provisional application No. 62/403,023, filed on Sep. 30, 2016.

(51) Int. Cl.
*G06F 17/00* (2006.01)
*G11B 27/034* (2006.01)
(Continued)

(52) U.S. Cl.
CPC ...... *G11B 27/034* (2013.01); *G06F 17/30772* (2013.01); *G10H 7/008* (2013.01); *G10H 2210/145* (2013.01); *G10H 2210/385* (2013.01)

(58) Field of Classification Search
CPC ....... G10H 2210/385; G10H 2250/035; G10H 7/008; G10H 1/46; G10H 2210/125;
(Continued)

(56) References Cited

U.S. PATENT DOCUMENTS 9,111,519 B1 * 8/2015 Yang .................... G10H 1/40
2013/0031216 A1   1/2013 Willis et al.
(Continued)

FOREIGN PATENT DOCUMENTS

GB          2464545 A    4/2010
WO   WO 2008/004971 A1  1/2008

OTHER PUBLICATIONS

Aubio, "What is Aubio?," Aubio, a Library for Audio Labelling, downloaded on May 30, 2013 from http://aubio.org/, 2 pgs.
(Continued)

*Primary Examiner* — Thomas H Maung
(74) *Attorney, Agent, or Firm* — Morgan, Lewis & Bockius LLP

(57) ABSTRACT

A method comprises obtaining a playlist that comprises a plurality of audio items, and dividing the playlist into a plurality of coherent groups, wherein each coherent group comprises a respective sequence of audio items of the plurality of audio items with a common attribute. For a respective coherent group of the plurality of coherent groups, the method comprises determining a parameter value of a first audio item of the respective sequence and adjusting a parameter value of a second audio item of the respective sequence based on the determined parameter value of the first audio item, to form a transition between the first and second audio items. The first and second audio items are adjacent in the respective sequence. The transition is provided to a second electronic device for playback.

16 Claims, 9 Drawing Sheets

(51) Int. Cl.
*G10H 7/00* (2006.01)
*G06F 17/30* (2006.01)

(58) Field of Classification Search
CPC ....... G10H 2210/131; G10H 2210/145; G10H 2210/155; G06F 17/30772
See application file for complete search history.

(56) References Cited

U.S. PATENT DOCUMENTS

| | | |
|---|---|---|
| 2013/0123019 A1 | 5/2013 | Sullivan et al. |
| 2013/0290818 A1 | 10/2013 | Arrasvuori et al. |
| 2014/0075308 A1* | 3/2014 | Sanders ............ G06F 17/30772 715/716 |
| 2015/0073812 A1* | 3/2015 | Lowe ........................ G10H 1/06 704/500 |

OTHER PUBLICATIONS

Bohrarper, Office Action, U.S. Appl. No. 14/289,438, dated Sep. 12, 2014, 20 pgs.
Bohrarper, Final Office Action, U.S. Appl. No. 14/289,438, dated Jan. 12, 2015, 34 pgs.
Bohrarper, Office Action, U.S. Appl. No. 14/289,438, dated Nov. 9, 2015, 35 pgs.
Bohrarper, Final Office Action, U.S. Appl. No. 14/289,438, dated May 18, 2016, 38 pgs.
Bohrarper, Office Action, U.S. Appl. No. 14/289,438, dated Nov. 4, 2016, 7 pgs.
Bohrarper, Final Office Action, U.S. Appl. No. 14/289,438, dated Jun. 2, 2017, 8 pgs.
Spotify AB, Communication Pursuant to Article 94(3) EPC, EP14170269.6, Mar. 16, 2015, 7 pgs.
Vamp Plugins, "The Vamp Audio Analysis Plugin System," downloaded on May 30, 2013 from http://www.vamp-plugins.org/, 2 pgs.

* cited by examiner

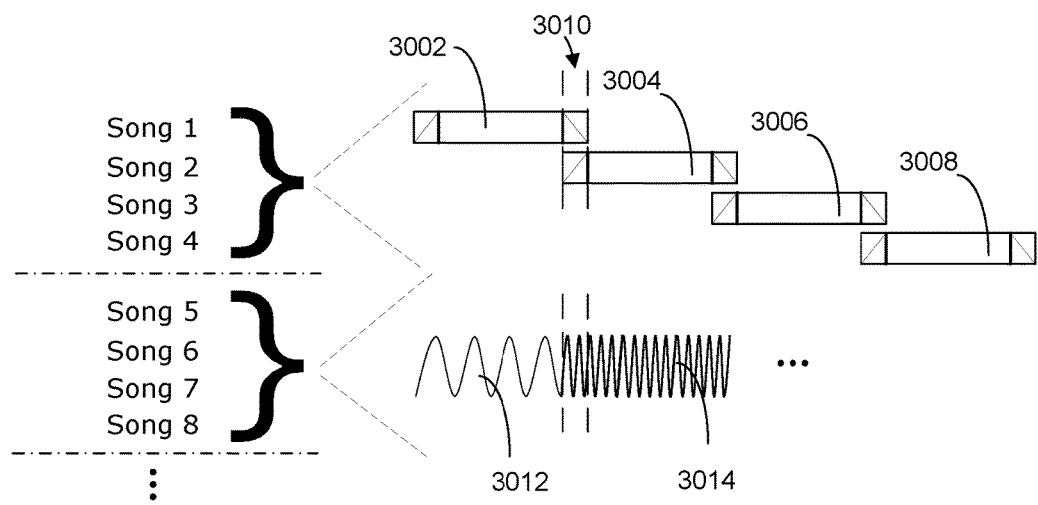
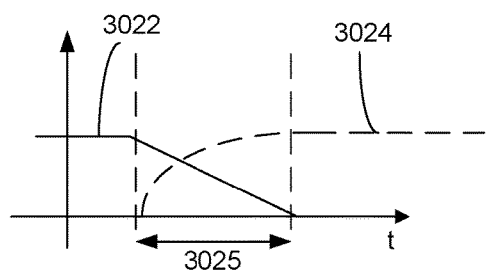
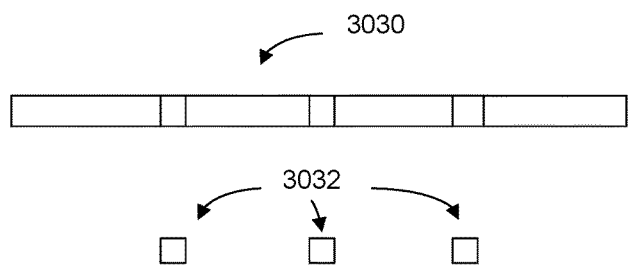
Fig. 3a
Fig. 3b
Fig. 3c

METHODS AND SYSTEMS FOR GROUPING PLAYLIST AUDIO ITEMS

RELATED APPLICATION

This application claims priority and benefit to U.S. Provisional Application No. 62/403,023, filed Sep. 30, 2016, entitled "Methods and Systems for Grouping Playlist Audio Items," which is hereby incorporated by reference in its entirety.

TECHNICAL FIELD

The present disclosure generally relates to the providing (e.g., streaming) of media content, and in particular to methods of controlling playback of audio media.

BACKGROUND

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) on a variety of electronic devices in various environments.

Commonly, the notation "streamed media" is used to denote media that is not permanently stored in an electronic device at which a user consumes the media. Streamed media may be distributed from a provider to a host as audio blocks (e.g. as sub-items of audio items). Typically, when performing playback of streamed media, the host receives information regarding which audio blocks to play, and optionally, accompanying decryption keys that can unlock the audio blocks. The media server may also provide information regarding potential locations of the audio blocks. The host determines whether it already has the audio blocks stored and, if not, the host requests any missing audio blocks either from one of the potential locations or from the media server. When playing an audio item, the host unlocks the audio blocks to build up the audio item by applying the received decryption keys.

When performing playback of audio media (e.g. listening to songs), a user may consume a sequence of media content items at a user interface of an electronic device. The sequence of media content items may be received from a media server. A media content item may be characterized by various media parameters (e.g. volume, tempo, style, etc.). A transition between two consecutive media content items with divergent media-parameter values may be perceived as annoying for the user. For instance, if the ending media content item has a slow tempo and the starting media content item has a fast tempo, the user may find the transition unpleasant. In situations where playlists are organized, or otherwise compiled, by a plurality of people (e.g. at a party) the sequences of media content items may be perceived as more or less randomly organized with large variations of media-parameter values between consecutive media content items (e.g., songs).

Thus, there is a need to improve the user experience when delivering media content (e.g. through streaming services).

SUMMARY

In a first of its aspects, this disclosure concerns a method performed by a first electronic device for controlling playback of audio items at a second electronic device. The method comprises obtaining a playlist that comprises a plurality of audio items, and dividing the playlist into a plurality of coherent groups, wherein each coherent group of the plurality of coherent groups comprises a respective sequence of audio items of the plurality of audio items with a common attribute. For a respective coherent group of the plurality of coherent groups, the method comprises determining a parameter value of a first audio item of the respective sequence and adjusting a parameter value of a second audio item of the respective sequence based on the determined parameter value of the first audio item, to form a transition between the first and second audio items, wherein the first and second audio items are adjacent in the respective sequence. Furthermore, for the respective coherent group the method comprises providing the transition to a second electronic device for playback.

In some embodiments, the method further comprises at the first electronic device, including the transition as an audio item between the first and second audio items in the respective sequence.

In some embodiments, the method further comprises as the first electronic device, forming a coherent-group audio item comprising the first audio item, the second audio item, and the transition, and providing the coherent-group audio item to the second electronic device for playback, wherein providing the coherent-group audio item comprises providing the transition. In some embodiments, the respective sequence of the respective coherent group comprises multiple successive pairs of audio items, and the method further comprises, at the first electronic device, for each successive pair of the multiple successive pairs, determining a parameter value associated with one audio item of the successive pair and adjusting a parameter value of another audio item of the successive pair based on the determined parameter value of the one audio item, to form a transition for the successive pair, wherein forming the coherent-group audio item comprises combining the multiple successive pairs and their respective transitions in the coherent-group audio item. In some embodiments, providing the coherent-group audio item to the second electronic device comprises sending a location where the coherent-group audio item is stored to the second electronic device.

In some embodiments, the first electronic device is a server having storage; and obtaining the playlist comprises retrieving the playlist from the storage. In some embodiments, obtaining the playlist comprises receiving the playlist from the second electronic device.

In some embodiments, determining the parameter value of the first audio item comprises analyzing a portion of the first audio item, and adjusting the parameter value of the second audio item comprises adjusting a portion of the second audio item. In some embodiments, the first audio item precedes the second audio item in the respective sequence, analyzing the portion of the first audio item comprises analyzing a final portion of the first audio item, and adjusting the portion of the second audio item comprises adjusting an initial portion of the second audio item. In some embodiments, the first audio item follows the second audio item in the respective sequence, analyzing the portion of the first audio item comprises analyzing an initial portion of the first audio item, and adjusting the portion of the second audio item comprises adjusting a final portion of the second audio item.

In some embodiments, the method further comprises at the first electronic device and for the respective coherent group: before adjusting the parameter value of the second audio item, determining a parameter value of the second audio item, and adjusting the parameter value of the first audio item based on the determined parameter value of the second audio item, to form the transition, wherein the transition is based on the adjusted parameter values of the first and second audio items.

In some embodiments, the parameter values of the first and second audio items relate to playback tempos and adjusting the parameter value of the second audio item comprises adjusting a playback tempo of at least a portion of the second audio item. In some embodiments, the parameter values of the first and second audio items relate to playback volumes and adjusting the parameter value of the second audio item comprises adjusting a playback volume of at least a portion of the second audio item. In some embodiments, the parameter values of the first and second audio items are values of a parameter selected from the group consisting of playback volume, playback tempo, equalizer settings, playback speed, playback style, reverb, echo, delay, sound effects, fillers, and bumpers.

In some embodiments, providing the transition comprises sending the transition to the second electronic device. In some embodiments, adjusting the parameter value of the second audio item is performed in accordance with a transition rule.

In a second of its aspects, this disclosure concerns a first electronic device, which comprises one or more processors and memory storing computer program code, which when run by the one or more processors, cause the first electronic device to perform the above method.

In a third of its aspects, this disclosure concerns a non-transitory computer-readable storage medium storing one or more programs, the one or more programs comprising instructions, which, when executed by a first electronic device with one or more processors, cause the first electronic device to perform the above method.

BRIEF DESCRIPTION OF DRAWINGS

These and other aspects, features and advantages will be apparent and elucidated from the following description of various embodiments, reference being made to the accompanying drawings, in which:

FIGS. 3a-3c illustrate examples of transitions in accordance with some embodiments;

Like reference numerals refer to corresponding parts throughout the figures and description.

DETAILED DESCRIPTION

Figure 1A:
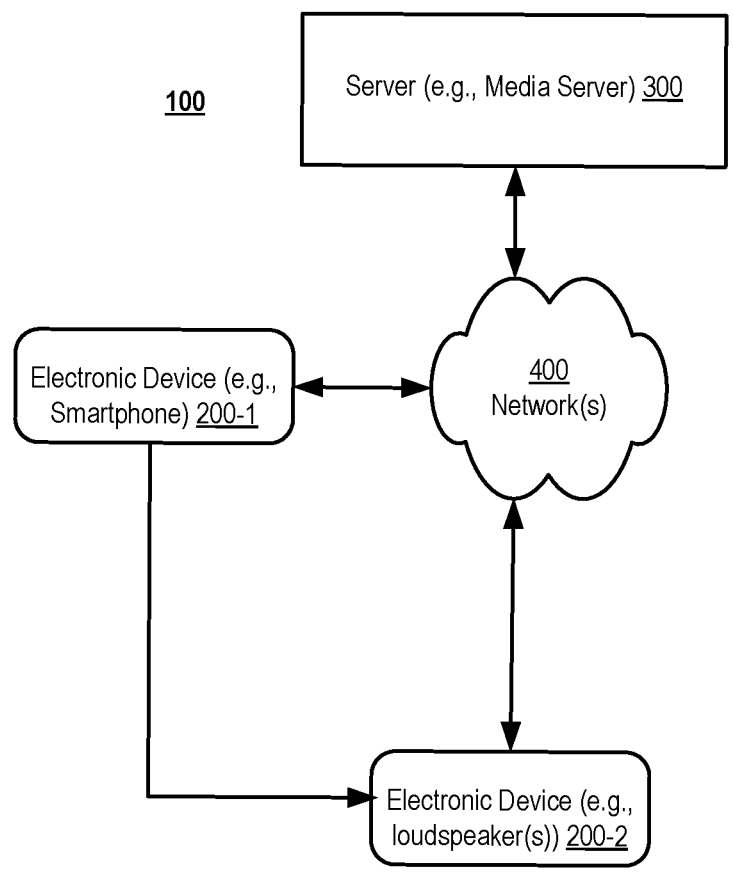
FIGS. 1a-1b illustrate systems for playback of audio content, in accordance with some embodiments.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art.

The expression "coherent group" is generally used to mean a group of audio items (e.g. songs) likely to be perceived by users as fitting well together. For example, all of the audio items in a coherent group may share a common attribute, such as a common genre, danceability, energy, tempo, etc. Additionally, or alternatively, the audio items of a coherent group may have introductory and/or finishing portions that fit well with (e.g., share one or more common attributes with) introductory and/or finishing portions of other audio items of the same coherent group.

A coherent group may comprise a sequence of songs (e.g., song n, song n+1, song n+2, song n+3, etc., where n is an integer used as an index). By putting together coherent groups of suitable songs, user experience for an audience (e.g., that is dancing) may be improved. To further improve the user experience, appropriate transitions between consecutive songs within the blocks may be provided. The audio items of a coherent group do not have to be complete songs. Instead, any of the audio items may be a part of a song (e.g. a cropped version of the song), a sample of the song, or another type of audio item.

The term "coherent-group media item" denotes an audio item that comprises a sequence of media items (i.e., audio items) with formed transitions between the media items.

The term "transition media item" denotes an audio item that comprises a formed transition between two other media items.

An audio media consumer who listens to audio media may receive either a sequence of non-mixed audio items (e.g. corresponding to an album) or a prepared mix of audio items. Such a prepared mix may be made and sent (i.e. transmitted) as a long audio item comprising all audio items of the sequence. The prepared mix may be automatically made by a media server. The media consumer's ability to affect the media content to be received is limited. In practice, the media consumer may want to modify his/her playlist in response to the current situation, and receive adapted media in accordance with the modified playlist. For instance, at a party it may be desired to be able to adjust the currently received media content to the party guests' mood, and still receiving audio items with appropriately prepared transitions between them. But if prepared transitions are made in advance, the media consumer may not be able to adjust the received audio media to the current situation.

Techniques for enabling media consumers to adjust a currently received media stream and still receive prepared transitions will now be described.

In some embodiments, each coherent group comprises a plurality of songs (e.g., four songs). Within each coherent group the media server processes the endings of audio items based on subsequent beginnings of audio items (or vice-versa). For example, in a coherent group of 4 songs, the beginning of song 2 will affect the ending of song 1, the beginning of song 3 will affect the ending of song 2, and the beginning of song 4 will affect the ending of song 3. In some embodiments, the switches between songs within a coherent group will get prepared transitions, while the switches between coherent groups for songs of different coherent groups do not get prepared transitions. That is, a switch between the last song of one coherent group and the first song of the following coherent group does not get a prepared transition. Thus, for coherent groups with four songs, three of the four switches (i.e., 75%) get prepared transitions. The audience (e.g., on the dance floor) will thus hear prepared transitions for a majority of the switches between songs.

Table 1 below illustrates examples of ratios between prepared transitions and non-prepared transitions for coherent groups of different sizes. As seen in Table 1, by increasing the number of songs in the coherent groups, the percentage of prepared transitions will increase. However, the ratio does not increase linearly with the number of songs in the groups. The numbers of songs in Table 1 are merely examples. Also, the number of audio items in coherent groups may be constant or may vary between coherent groups.

TABLE 1

| Songs | Prepared | Non-prepared | Ratio |
|---|---|---|---|
| 2 | 1 | 1 | 50% |
| 3 | 2 | 1 | 67% |
| 4 | 3 | 1 | 75% |
| 5 | 4 | 1 | 80% |
| 6 | 5 | 1 | 83% |

There is a tradeoff between flexibility and appearance in deciding the size of coherent groups. Increasing the number of audio items within the coherent groups may facilitate a more effective use of installed processing capacity of the media server because the media server can prepare more transitions in advance for each coherent group. Thus, processing capacity that is not used for transmission may be used for calculating, or otherwise determining, appropriate transitions. However, increasing the number of audio items in the coherent groups may be perceived as inflexible by media consumers and give rise to degraded user experience. Decreasing the number of audio items in the coherent groups may increase the flexibility for media consumers at the expense of the ratio of prepared transitions, which also may give rise to degraded user experience. It has been realized that allocating four audio items to each coherent group is an effective balance between flexibility for the media consumers and quality of transitions. The media consumers (i.e., end users) may then perceive that the music mix is appropriately prepared while their ability to flexibly affect the content of the music is good.

FIG. 1a schematically illustrates a media content delivery system 100 in accordance with some embodiments. The media content delivery 100 may comprise one or several electronic devices 200 (e.g., first electronic device 200-1 and second electronic device 200-2), and one or more servers 300 (e.g., computer server(s) such as media content server (s), which are sometimes referred to as media server(s)).

In some embodiments, an electronic device 200 may be a mobile telephone, such as a smart phone. Alternatively, an electronic device 200 may be a tablet computer. In yet other embodiments, an electronic device 200 may be any other electronic device (e.g., capable of playback of media content) such as, for example, a personal computer, a laptop, or a mobile electronic device (e.g. a handheld entertainment device, a digital media player, or other media device).

One or several networks 400 may communicatively couple the components of the media content delivery system 100. The network(s) 400 may include public communications networks, private communication networks, or a combination of both public and private communication networks. For example, the networks(s) may include any network(s) such as the Internet, other wide area networks (WAN), wireless wide area networks (WWAN), local area networks (LAN), wireless local area networks (WLAN), virtual private networks (VPN), metropolitan area networks (MAN), peer-to-peer networks, and/or ad-hoc networks. The network(s) 400 may comprise cellular telecommunications network(s) and/or non-cellular network(s).

In some embodiments, an electronic device 200 (e.g., the first electronic device 200-1 in the following example) is capable of remotely controlling other electronic device(s) 200 (e.g., the second electronic device 200-2 in the following example). For example, the first electronic device 200-1 may receive a media control command (e.g., a user input) for the second electronic device 200-2 (e.g. speaker(s)). In response to receiving this media control command, the first electronic device 200-1 sends a server media control request to the server 300 and/or a local media control request to the second electronic device 200-2, which may be located within the same local network (e.g. a LAN) as the first electronic device 200-1 (i.e., a local network to which both the first electronic device 200-1 and the second electronic device 200-2 are connected). The server media request and the local media request are both configured to cause a media control operation to be implemented at the second electronic device 200-2. The server media control request may for example be sent to the server 300 over the Internet. Typically, but not necessarily, the server 300 is associated with an Internet Protocol (IP) address outside the space of the local network to which both the first electronic device 200-1 and the second electronic device 200-2 are connected. The first electronic device 200-1 and the second electronic device 200-2 may thus be associated with IP addresses within the same sub-network. The first electronic device 200-1 provides a user interface that allows a user 600 (FIG. 1b) to select media content for presentation by the electronic device 200-1 itself and/or to generate media control request (s) to cause the media content to be presented (e.g., played) by the second electronic device 200-2. For instance, the second electronic device 200-2 may include one or more speakers that are capable of receiving media content, but do not have any user interface(s).

In an example scenario related to a social gathering (e.g., a party), a host (i.e., a user) may thus interact with his or her first electronic device 200-1 to remotely control the playback of media content at the second electronic device 200-2 (e.g., the playback of music content through speakers(s)). This way, the host can control the playback of music at the social gathering.

Figure 1B:
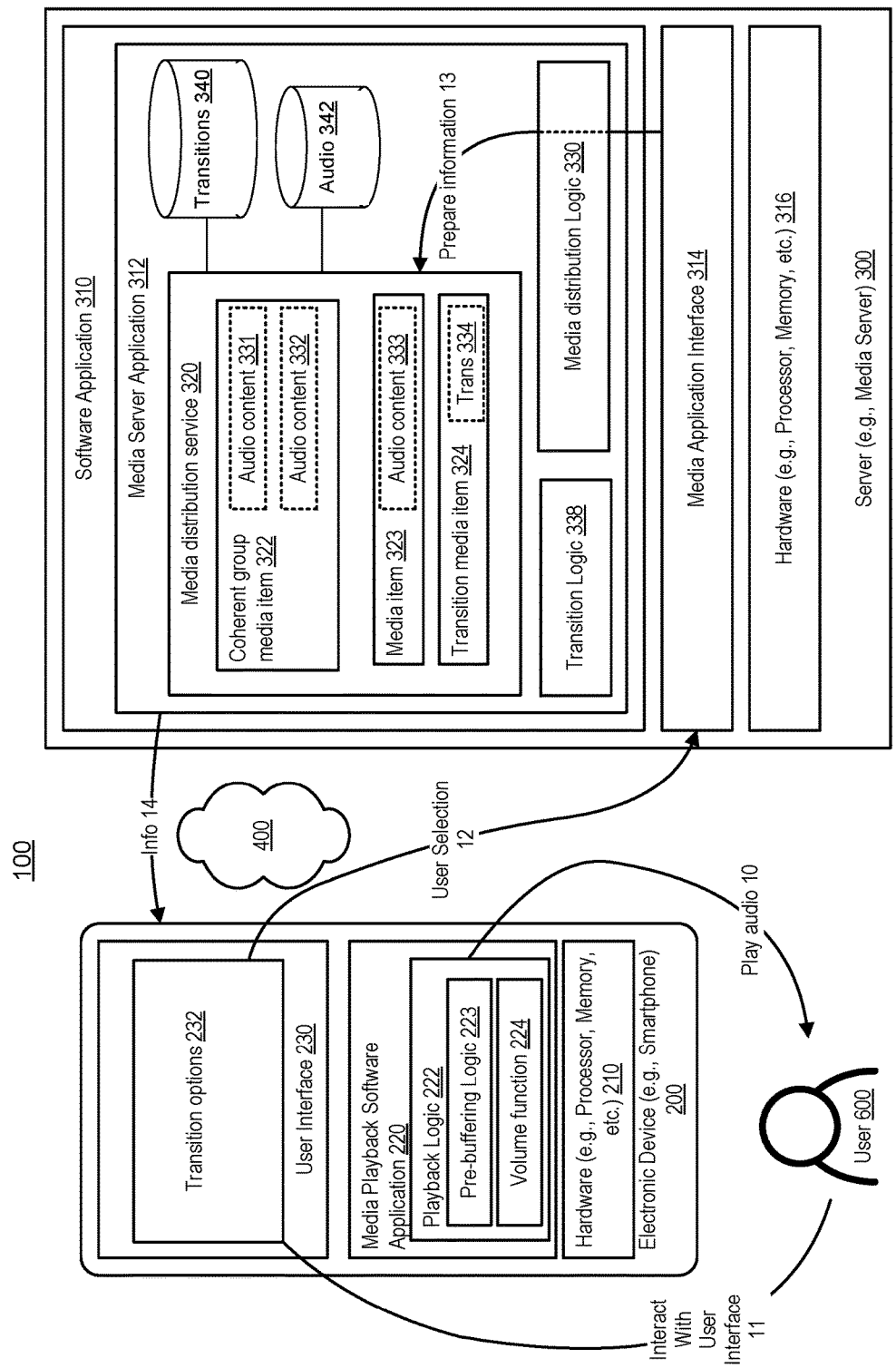

FIG. 1b shows an electronic device 200 (e.g. the first electronic device 200-1 of FIG. 1a) communicatively coupled to the server 300 via the network(s) 400 (e.g. the Internet), in accordance with some embodiments. While FIG. 1b only shows a single electronic device 200 and a single server 300, the server 300 may support the simultaneous use of multiple electronic devices 200-1, 200-2, etc., and/or the electronic device 200-2 can simultaneously access media content at multiple servers 300. FIG. 1b is intended more as a functional description of the various features, or components, which may be present in one or more servers, rather than a structural schematic of the various implementations described throughout this disclosure. In practice, components shown separately could be combined and some components could be separated.

In the following description and in order not to obscure the detailed description with unnecessary detail, the media content will in general be exemplified to be audio content (e.g. music). This should, however, not be interpreted as limiting the scope of the various embodiments.

The electronic device 200 (e.g., the first electronic device 200-1 or the second electronic device 200-2, FIG. 1a) may be used for the playback of media content (e.g., audio content such as music), which is provided by the server 300.

The electronic device 200 may include one or several physical computer resources (i.e., hardware resources 210). The hardware resources 210 may include one or several processors (or, processing circuitry), a communications interface (or, communication circuitry), and one or several memories. Likewise, the server 300 (e.g., a media server) may include one or several physical computer resources (i.e., hardware resources) 316. The hardware resources 316 may likewise include one or several processors (or, processing circuitry), a communications interface (or, communication circuitry), and one or several memories.

The server 300 may include an operating system or other processing system which supports execution of a software application 310, including a media server application 312 which may be used, for example, to send information related to media content such as audio content (e.g., music). A media distribution service 320 may be used to buffer information related to media items 322, 323, 324 (e.g. regarding one or more coherent-group media items 322 or transition media items 324). A media application interface 314 may receive requests from electronic devices 200 or other systems to retrieve information regarding media content 331, 332, 333, 334 (e.g. audio content or transition content) from the server 300.

Information regarding media content (e.g., audio items) may be stored within one or more memories. For example, a transitions database 340 stores transitions and an audio database 342 stores other audio items (e.g., songs). Alternatively, information regarding media content may be received by the server 300 from another source (not shown). This other source (not shown) could be external to the server 300 (i.e., located remotely from the server 300).

Media distribution logic 330 may be used to retrieve or otherwise access the media content 331, 332, 333, 334 in response to requests from electronic devices 200 or other systems, and prepare information related to coherent-group media items 322, media items 323, and transition media items 324 that may be returned to the requesting electronic device 200.

Transition logic 338 may be used to retrieve or otherwise access media content 331, 332, 333, 334 (e.g., songs and transitions), and put together coherent media group items 322 based on the retrieved or accessed media items. Furthermore, the transition logic 338 may retrieve transition media items to be distributed by the media distribution logic 330. Thereby, the computer system 300 may distribute appropriate transitions for coherent groups, both in coherent-group media items (e.g., item 3030, FIG. 3c) and as transition media items (e.g., items 3032, FIG. 3c).

The electronic device 200 comprises a user interface 230. The user interface 230 displays or otherwise provides a playlist of audio items and determines user input.

Selecting an audio item at the user interface 230 may be interpreted as a request or instruction to the media server application 312 to return information related to the audio item. For example, the software application 310 at the server 300 prepares and distributes media content to the electronic device 200 (or to another electronic device 200 distinct from the electronic device 200 that sent the request or instruction to the server 300), and the user interface 230 displays a plurality of media options that correspond to respective media content items (e.g., audio items).

In some embodiments, the electronic device 200 includes a media playback application 220 with playback logic 222, which includes pre-buffering logic 223 and a volume function 224. The media playback application 220 controls the playback of media content that is received from the media server application 312.

A user 600 may interact 11 with the user interface 230 of the electronic device 200 and issue requests, for example the playing of a selected media option. The user's selection of a particular media option may be communicated 12 to the media server application 312, via the media application interface 314. The media server application 312 may then be instructed 13 to prepare information about corresponding media content. This information includes, for example, partial media items, locations of partial media items, and/or decryption keys. The media server application 312 distributes 14 the prepared information to the user's electronic device 200 (or another device). In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested media content to the user 600.

Figure 2A:
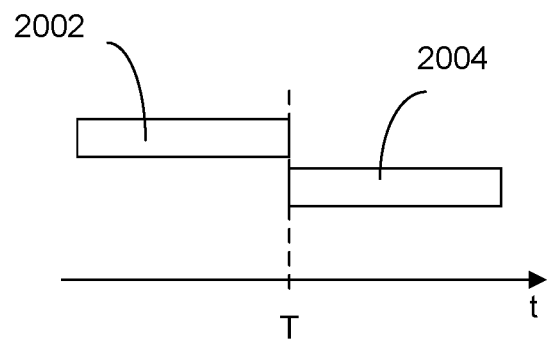
FIGS. 2a-2c illustrate examples of transitions.
Figure 2B:
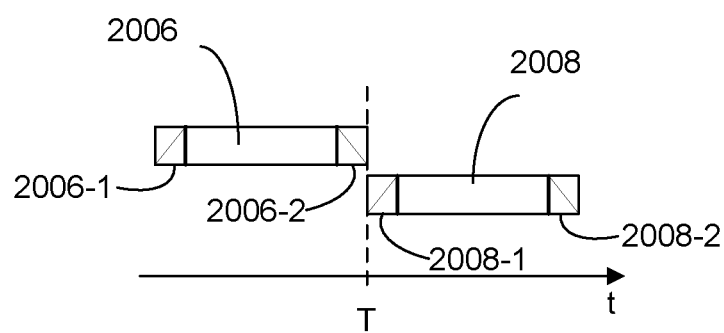
Figure 2C:
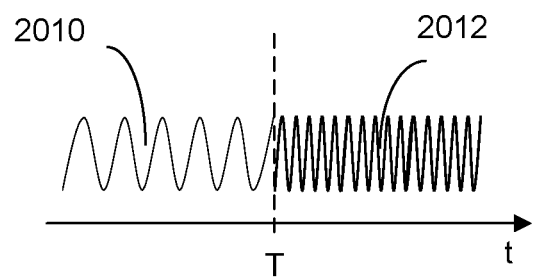

FIGS. 2a-2c illustrate three examples of transitions between audio items. In these embodiments the audio items are songs.

FIG. 2a shows two consecutive songs 2002, 2004. Typically, the media content is received and played by an electronic device 200. The first song 2002 ends at a time T when the second song 2004 starts. Media parameter values of the songs 2002, 2004 typically diverge and the user may therefore notice an abrupt change of media parameter values at the time T, which could be perceived as annoying and disturbing.

FIG. 2b shows two consecutive songs 2006, 2008. Initial portions 2006-1, 2008-1 of the songs 2006, 2008 are faded in and final portions 2006-2, 2008-2 are faded out. The playback volume, which is an example of a media parameter value, is increased in the initial portions 2006-1, 2008-1 and decreased in the final portions 2006-2, 2008-2. This type of switching between consecutive songs may be perceived smoother than in the example of FIG. 2a. However, at a party (e.g. when people are dancing), the switches between songs may be perceived as interruptions which may negatively affect the user experience.

FIG. 2c shows a media parameter value for two consecutive songs 2010, 2012. In this example, the media parameter value corresponds to the playback tempo (i.e., the beat). The playback tempo at the end of song 2010 is lower than the playback tempo at the start of song 2012. When the switch takes place at the time T, the user will notice the instantaneous increase in playback tempo. To avoid this instantaneous increase, a transition may be prepared for songs 2010, 2012.

In some embodiments, transitions between audio items are generated by adapting a parameter value of a song or portion thereof with respect to the parameter value of an adjacent song or portion thereof. Two examples of parameters whose values may be adapted are playback volume and tempo (i.e., beat or characterizing frequency). In general, however, any suitable type(s) of parameter values or combination of parameter values may be used to generate transitions. Other examples include equalizer (EQ) settings; playback tempo through variable time stretching; playback speed though resampling; playback style; audio effects such as reverbs, echoes, delays, compressors, and limiters; playback looping of an audio section; playback panning; adding sound effects, fillers, and bumpers; etc.

FIG. 3a shows provisioning of prepared transitions between consecutive songs, in accordance with some embodiments.

The audio items in a playlist may be divided into a plurality of coherent groups, wherein each coherent group comprises a plurality of songs that share a common attribute. For example, a playlist is divided into coherent groups of four consecutive songs each. In FIG. 3a, a first coherent group of songs 3002, 3004, 3006, 3008 (i.e., song 1, song 2, song 3, song 4) is illustrated as four blocks with overlapping portions. The final portion of song 1 3002 overlaps the initial portion of song 2 3004, the final portion of song 2 3004 overlaps the initial portion of song 3 3006, etc.

Song 1 3002 and song 2 3004 have portions located in a transition window 3010. Playback volume is the media parameter value that is adjusted for the songs 3002, 3004, 3006, 3008. The playback volume of the first song 3002 decreases at the end while the playback volume of the second song 3004 increases as it begins to play. When preparing the transition for the transition window 3010, the server 300 decreases the playback volume of the first song 3002 based on the playback volume of the second song 3004. The media server determines the playback volume of the second song 3004, which is increasing, and adjusts the playback volume of the first song 3002 such that it decreases in relation to the increasing playback volume of the second song 3004.

Other suitable relations between playback volumes of songs may be applied when appropriate. Also, instead of or in addition to adjusting a parameter value for final portion of an initial song, a parameter value of an initial portion of a subsequent song may be adjusted based on a parameter value of the final portion of the initial song. Parameters values may be determined and adjusted for both songs according to any suitable algorithm. It is to be understood that when referring to songs as first, second, third, etc., the terms first, second, third, etc. do not indicate the order of the songs.

In FIG. 3a, a second coherent group of songs includes song 5, song 6, song 7, and song 8. A transition between song 5 and song 6 is performed in a transition window 3010. A playback tempo of song 5 differs from the playback tempo of song 6. The higher playback tempo of song 6 is determined and the playback tempo of the final portion of song 5 is adjusted based on the determined higher playback tempo. For example, the final portion of song 5 it may be time-stretched so that the playback tempo of song 5 is adapted to the playback tempo of song 6. The playback tempo of the ending song is speeded up to the playback tempo of the starting song. A consequence of this processing is that to a listener it appears that song 5 speeds up to the speed of song 6 and that song 5 transitions into song 6. In addition, by adjusting further media parameter values (e.g. playback volume or equalizer settings) the transition may be perceived as even more smooth and natural. However, adapted transitions are not necessarily made to achieve smooth and natural switches between adjacent audio items. The parameter values may be adjusted in an alternative manner (e.g. to create dramatic musical effects). Thereby, appropriate transitions that make musical sense to an audience are achieved.

When a song is time-stretched it may either be speeded up or slowed down, and as a consequence the time-stretched portion may become shorter or longer The time-stretched portion thus will typically not cover the whole transition window, or a part of the time-stretched portion will not fall within the transition window. To overcome this, the length of the portions of the songs to be time-stretched may be dynamically selected such that the time-stretched portion will have the length of the transition window.

In some embodiments, the length of the transition window is adjusted to fit the time-stretched portion(s). For instance, if the transition window is typically 3 seconds, and the portion of an ending song is 3 seconds but will be time-stretched to 2 seconds, the transition window is adjusted to 2 seconds.

In FIG. 3a, the playback tempo is illustrated as being constant through the whole transition window. However, the playback tempo may be dynamically adjusted within the transition window. For instance, the playback tempo of song 5 may be dynamically adjusted, such that it increases smoothly during the whole transition window and reaches the determined playback tempo of song 6 at the end of the transition window.

In another alternative embodiment, a method of performing a transition will now be described with reference to FIG. 3b, which is a schematic illustration.

FIG. 3B shows playback volumes of two consecutive audio items 3022, 3024 in accordance with some embodiments. In a transition window 3025, the playback volume of the ending audio item 3022 decreases and the playback volume of the starting audio item 3024 increases. The playback volumes of both audio items 3022, 3024 are adjusted throughout the transition window, but the volume of the ending audio 3022 item is linearly decreased throughout the transition window, whereas the volume of the starting audio item 3024 is instead increased in accordance with a pre-defined non-linear function. An advantage of amending both the audio items is that a more smooth and natural transition is. By selecting an appropriate pre-defined function, the starting audio item may be effectively emphasized.

In another alternative embodiment, two resulting formats of the mixed coherent group described in conjunction with FIG. 3a, will now be described with reference to FIG. 3c, which is a schematic illustration.

FIG. 3c shows a coherent-group media item 3030 that results from mixing of the coherent group in accordance with some embodiments. As illustrated, the coherent-group media item 3030 is a media item that includes the songs 3002, 3004, 3006, and 3008 along with prepared transitions between the songs. The server 300 distributes the coherent-group media item 3030 to another electronic device 200 (e.g. a speaker), which plays the coherent-group media item 3030.

Alternatively, a plurality of transition media items 3032 are generated and provided as distinct audio items. Each transition media item 3032 corresponds to a respective prepared transition of the coherent group. This alternative format may be distributed to electronic devices equipped with functionality for retrieving songs from appropriate locations storing the songs and putting together a mix of retrieved songs and received transitions.

In the above-described embodiments, final and initial portions of audio items have been used to make transitions. In some embodiments, however, other portions of audio items may be applied instead. For instance, one song may be cropped to align to a consecutive song. Furthermore, in the case that the audio items are implemented as songs, the audio items do not have to be complete songs. For instance, an audio item may be just a portion of a song (e.g. a sample of the song).

Figure 4A:
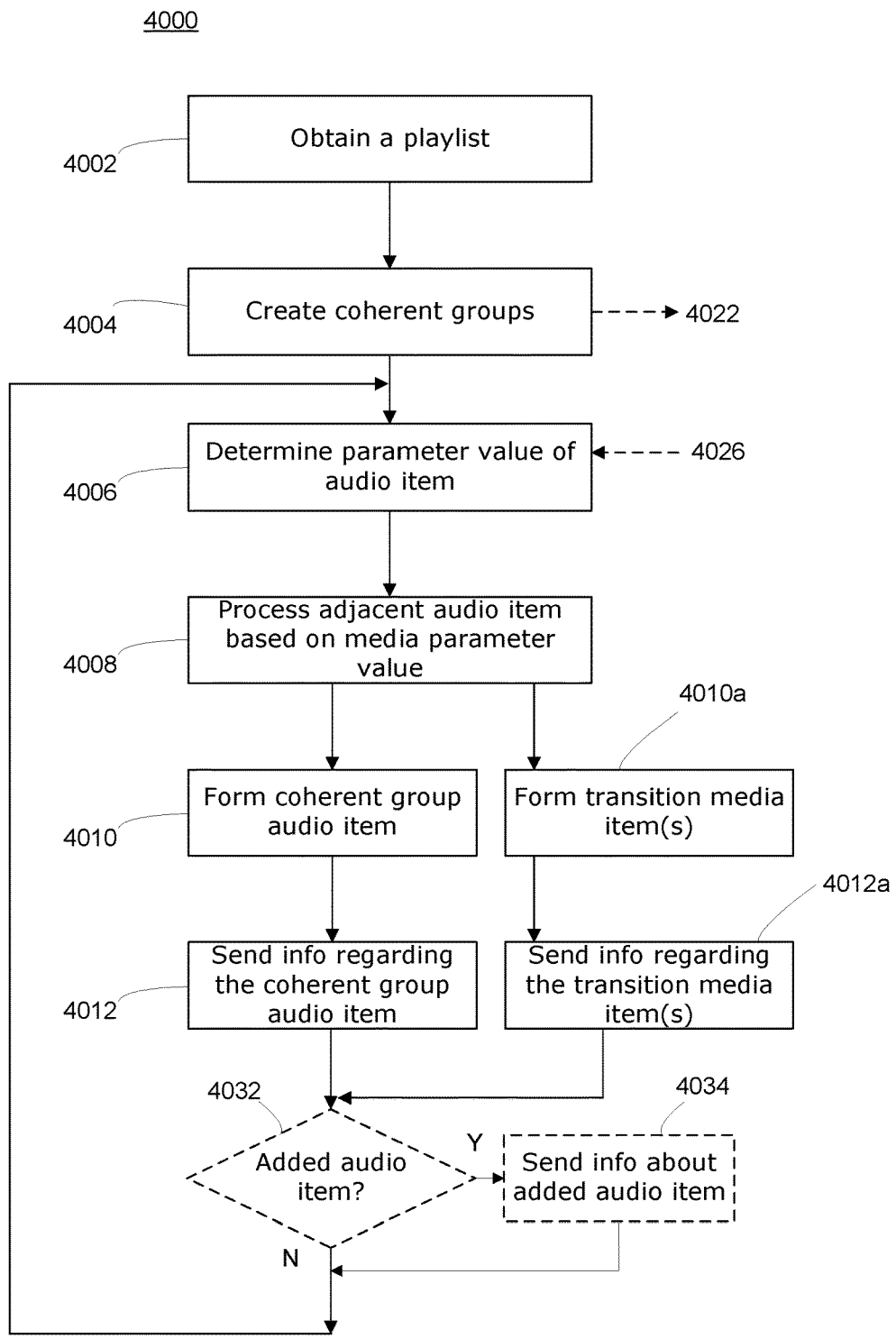
FIGS. 4a-4b illustrate flowcharts of methods according to some embodiments.

FIG. 4a is flowchart showing a method 4000 performed by a media server (e.g., the server 300) for controlling playback of media content in accordance with some embodiments. The method 4000 corresponds to one or more programs stored in the memory of the media server and configured for execution by the media server.

The media server obtains (4002) a playlist that comprises a plurality of audio items (e.g., songs). The media server may obtain the playlist in different ways. For example, the media server receives the playlist in a data message from an electronic device 200. The data message may be a request from the electronic device 200 or a response to a request sent to the electronic device 200 by the media server. Alternatively, the media server stores the playlist locally (e.g., in the memory of the media server) and retrieves it from the local storage.

The media server creates 4004 a plurality of coherent groups from the obtained playlist, by dividing the obtained playlist into the plurality of coherent groups. Each one of the coherent groups comprises a respective sequence of audio items of the plurality of audio items. For at least one of the plurality of coherent groups, the media server then performs the actions 4006-4012. The media server may repeat the actions 4006-4012 for all of the coherent groups.

The media server determines (4006) a parameter value which is associated with an audio item of the sequence. For instance, the determined parameter value may be related to playback volume, playback tempo in BPM (Beats Per Minute), etc. of the audio item. The parameter value may be determined by analyzing a portion of the audio item. For instance, a final portion of the audio item is analyzed to adjust an initial portion of an adjacent subsequent audio item, or an initial portion of the audio item is analyzed to adjust a final portion of an adjacent preceding audio item.

The media server processes (4008) an adjacent audio item of the sequence by adjusting a parameter value of the adjacent audio item based on the determined parameter value, to form a transition between the audio item and the adjacent audio item. The transition may be formed by adjusting a portion of the adjacent audio item with respect to the audio item. For instance, if the determined parameter value is playback tempo and the adjacent audio item has a lower playback tempo than the audio item, a portion of the adjacent audio item may be time-stretched to the playback tempo of the audio item, as described above for FIG. 3a. The time-stretch may be performed dynamically to achieve a smooth transition.

Furthermore, the end portion of an audio item may be adjusted with respect to an adjacent, subsequent audio item, but alternatively or in addition the initial portion of the adjacent, subsequent audio item may be adjusted with respect to the end portion of the audio item. In addition, both the end portion of the audio item and the initial portion of the adjacent, subsequent audio item may be adjusted with respect to each other to achieve a smoother and more natural transition.

Moreover, the processing may comprise obtaining at least one transition rule from a transition rule database and adjusting the parameter value(s) in accordance with the at least one transition rule.

The media server forms (4010) a coherent-group media item which comprises a combination of the adjacent audio item, the audio item, and the formed transition between them.

The media server sends (4012) information regarding the formed coherent-group media item to the electronic device 200. In some embodiments, the information includes audio blocks of the audio items and/or transitions, locations where the audio blocks are stored, decryption keys for the audio blocks, etc. In addition, the information may be formulated as a playlist of the coherent-group media item.

In some embodiments, actions 4010a and 4012a are performed instead of actions 4010 and 4012. The transition resulting from the processing 4008 is formed (4010a) into a transition media item(s). Information regarding the formed transition media item is sent (4012a) to the electronic device 200. Sending only information regarding the transitions (e.g. the transition media items, blocks of the transition media items, locations or decryption keys of media items or audio blocks, etc.) allows the receiving electronic device 200 to retrieve the audio items itself and put together the coherent group locally. Thereby, less data is sent.

Furthermore, by dividing the playlist into coherent groups, the media server lets a media consumer (i.e., end user) affect the playlist during the playback and still be provided with appropriate processed transitions.

Figure 4B:
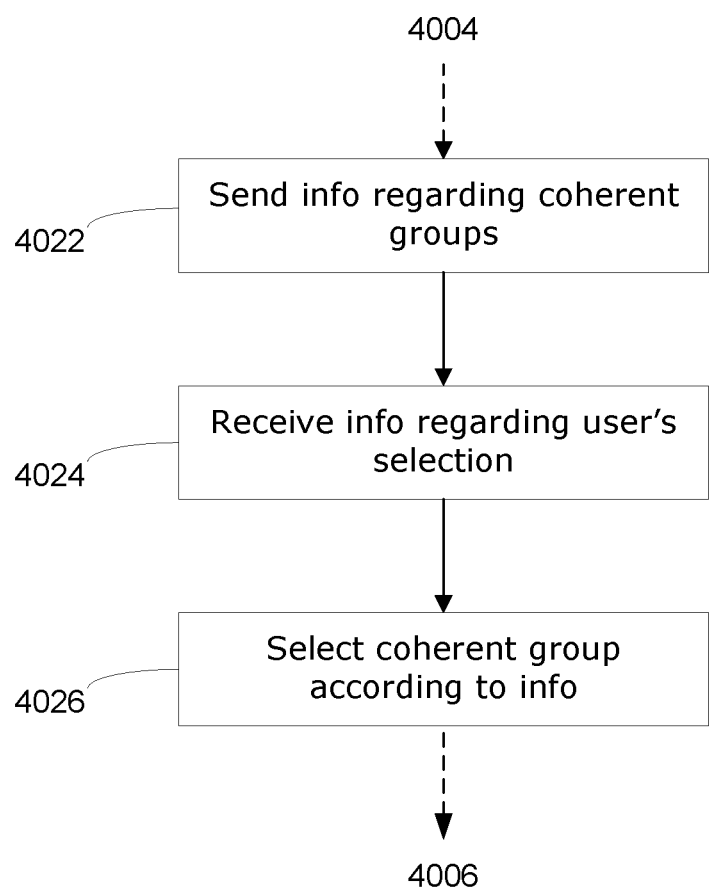

FIG. 4b is a flowchart showing a method 4020 in accordance with some embodiments. The method 4020 is performed in conjunction with the method 4000 (FIG. 4A). In the method 4020, the media server sends (4022) information regarding the coherent groups that results from the action 4004 (FIG. 4a). This information is sent in a data message to an electronic device 200.

In response to the data message, the media server receives (4024) another data message with information regarding a user's selection of one of the coherent groups. The user's selection may be made at a user interface of the electronic device 200. The media server selects (4026) one of the coherent groups in accordance with the user's selection. Thereafter, the media server performs the above described actions 4006-4012 on the selected coherent group.

Thus, by performing the actions 4022-4026 on the selected coherent group instead of proceeding directly from the action 4004 to action 4006, the method 4020 allows the user to affect the audio content and still receive appropriate processed transitions, which gives rise to increased flexibility and improved user experience.

In some embodiments, the media server determines (4032) whether a further audio item is to be added to the media content to be sent to the electronic device 200. This determination is performed, for example, by analyzing a history of earlier provided audio items. If the media server determines that a further audio item is to be added (4032—Y), the media server selects an appropriate audio item (e.g. from the history) and sends (4034) information regarding the further audio items to the electronic device 200, before proceeding with the action 4006. If, on the other hand, the media server determines that no further audio item is to be added (4032—N), the process proceeds directly with the action 4006. The media server thus influences media content to be played, in accordance with the user's preferences, which may improve the user experience further.

In some other embodiments, media server determines (4032) whether a user of the electronic device 200 has added a further audio item. This determination is made, for example, by sending information regarding the coherent groups that resulted from the dividing action 4004 (e.g., in a data message corresponding to the action 4022), and receiving another data message from the electronic device 200 specifying the user's addition of a further audio item to the playlist.

If no such another data message is received (4032—N), the method continues with the action 4006. If on the other hand such a data message is received (4032—Y), the media server sends (4034) information regarding the added audio item, before proceeding with the action 4006.

By enabling a user to add further audio items to a playlist between coherent groups, the user may listen to appropriately prepared transitions throughout the coherent groups, but also flexibly affect the media content in accordance with his/her personal preferences. Thus, the user experience is increased because flexibility increases without decreasing the quality of the transitions.

Above, methods of flexibly providing audio items with processed transitions have been disclosed. The media server interacts with an electronic device 200*a* that includes a media player.

In the above methods, transitions within the coherent groups are formed after the playlist is divided in coherent groups. Alternatively, transitions are formed in advance for specific sets of audio items (e.g., for sequences of audio items that often are played together). Transitions for such sequences may be pre-formed and stored at the media server in advance. Therefore, n some embodiments the actions 4006-4008 are omitted. Instead, the media server obtains pre-calculated transitions for the audio items of the coherent groups and forms (4010) the coherent-group media items.

Figure 5:
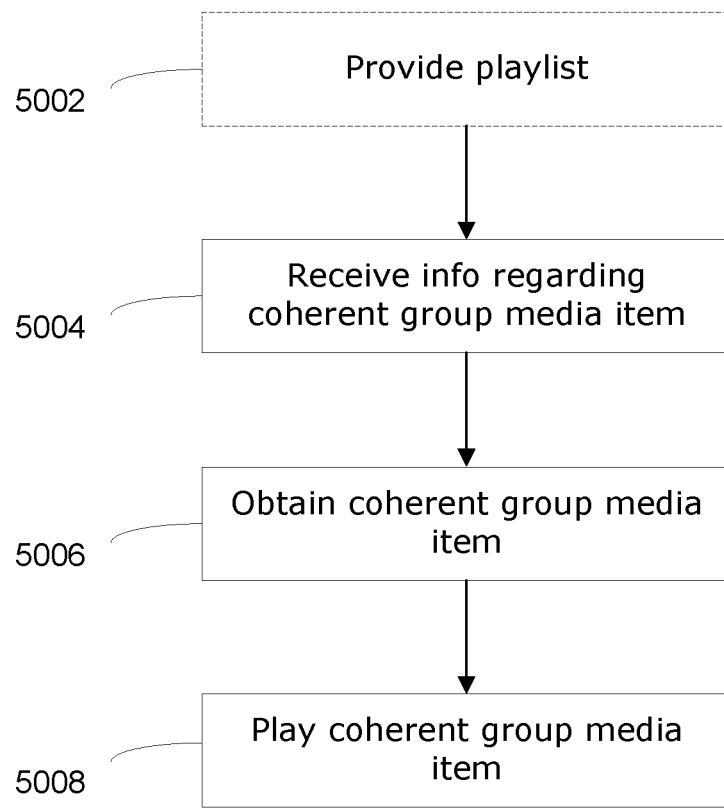
FIG. 5 illustrates a flowchart of a method according to some embodiments.

FIG. 5 is a flowchart showing a method 5000 performed by an electronic device 200 in accordance with some embodiments. The method 5000 corresponds to one or more programs stored in the memory of the electronic device 200 and configured for execution by the electronic device 200.

The tablet computer receives (5004) a data message from a media server (e.g., server 300). The received data message comprises information regarding one or more coherent-group media items. Each of the coherent-group media items comprises a respective sequence of audio items with formed transitions between the audio items.

The electronic device 200 obtains (5006) the one or more coherent-group media items from one or more locations based on the received information. The coherent-group media item(s) may be stored at one of more different locations as blocks or sub-items of the coherent-group media item(s), and the received information may comprise information specifying which blocks are stored at which locations, such that the one or more coherent-group media items may obtain all blocks of the coherent-group media item(s), whether or not they are locally stored or stored at external electronic devices.

The one or more coherent-group media items plays (5008) the coherent-group media item(s) or a portion thereof at a speaker of the electronic device 200 or at an external speaker.

In some embodiments, the electronic device 200 provides (5002) a playlist to the media server. Thereby, the media server may form the coherent-group media items from the user's playlist.

While playlists are described herein as comprising audio items, playlists may instead comprise references to (e.g., names of) the audio items, and not the content of the audio items.

FIGS. 6*a*-*d* show views of a user interface 230 in accordance with some embodiments.

Figure 6A:
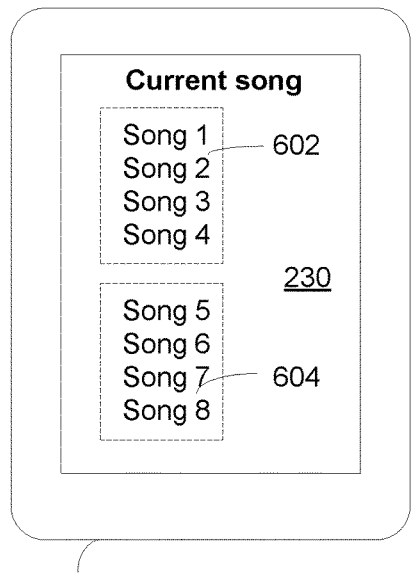
FIGS. 6a-6d illustrate views of a user interface according to some embodiments.
Figure 6B:
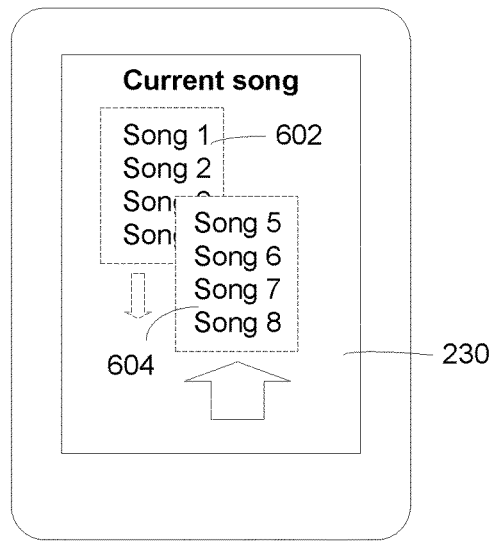
Figure 6C:
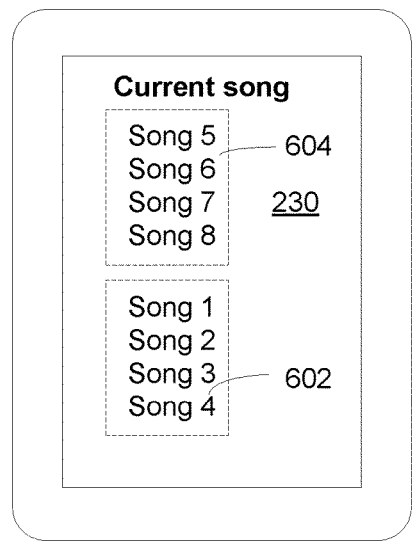

An electronic device 200 (e.g., a smartphone) has a user interface 230 on which a playlist is displayed. The playlist comprises a plurality of coherent groups 602, 604, and each of the coherent groups comprises a plurality of songs. For example, the coherent groups 602, 604 comprise four songs each. FIGS. 6*a*-*c* illustrate a scenario where a user (i.e., a media consumer) initiates a modification of a currently played playlist.

In FIG. 6*a*, the playlist of the currently played audio content is displayed for the user at the user interface 230. The title of the currently played song is displayed at the top and two coherent groups 602, 604 are displayed below. The user wants to change the order of songs by bringing the songs of the later-placed coherent group 604 forward: the user wants to start playing the songs of the coherent group 604 when the currently played song ends.

In FIG. 6*b*, the user provides a user input at the user interface to bring the coherent group 604 forward before the coherent group 602, which was scheduled to be played after the currently playing song. In some embodiments, the user input is a swipe gesture (shown as a wide arrow) with a fingertip. Alternatively, a different user input is received (e.g. a downwards swiping gesture on the coherent group 602, a tapping gesture on the coherent group 604, a rotation of a scroll wheel, a push of a control button, etc.). In response to the user input, the coherent group 602 is placed below the coherent group 604 and thus postponed in the playlist. Consequently, the corresponding change of order of the coherent groups 602, 604 will be made in the received audio content. In the FIG. 6*b* the postponing of the coherent group 602 is illustrated as a thin dashed arrow.

FIG. 6*c* illustrates the resulting playlist, which is displayed at the user interface 230. In the resulting playlist the postponed coherent group 602 is below the initially second placed coherent group 604.

Figure 6D:
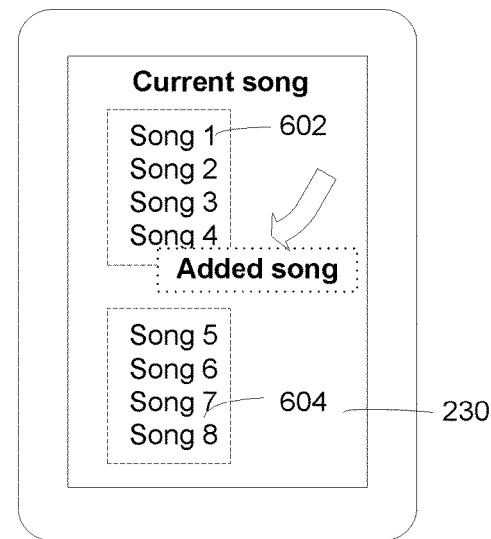

In FIG. 6*d*, the user interface 230 enables the user to add one or more audio item to the playlist between the coherent groups 602, 604. The user identifies a song ("Added song") to add to his/her playlist. For example, the song is found in a user-performed search. As illustrated in FIG. 6*d* with an unfilled arrow, the user swipes the title of the song to the playlist. The swiping causes the song to be placed between the coherent groups 602, 604. The user does not have to be aware of the coherent groups 602, 604, but may realize that the song could be included at specific positions (e.g., after the last song (Song 4) of the first coherent group 602, but before the first song (Song 5) of the second coherent group 604).

By enabling the user to include the title at specific positions, he/she may still enjoy prepared transitions within the coherent groups, but also may amend the media content to be played. Thereby, the user perceives the media consumption as both flexible and of high quality, which improves user experience. In addition, the user does not have to be explicitly aware of the coherent groups.

Similarly, a media server which provides the media content determines appropriate further media content items to be added to the playlist, and whether or not further media content items should be added (e.g., as in the actions 4032 and 4034, FIG. 4).

Example Computer-Readable Mediums

Figure 7A:
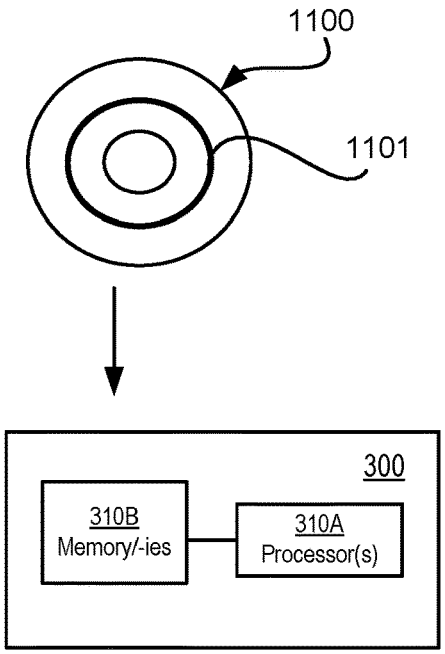
FIGS. 7a-7b illustrate examples of computer program products according to some embodiments.

FIG. 7*a* shows a non-transitory computer-readable medium, in this example in the form of a data disc 1100. In some embodiments, the data disc 1100 is a magnetic data storage disc. The data disc 1100 is configured to carry instructions 1101 that, when loaded into memory 310B of the server 300 and executed by the processor(s) 310A of the server 300, cause the server 300 to execute a method or procedure as disclosed herein (e.g., the methods 4000 and/or 4020, FIGS. 4*a*-4*b*). The data disc 1100 is arranged to be connected to or within and read by a reading device (not shown), for loading the instructions into the server 300. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a non-transitory computer-readable medium in the memory 310B, by modulating the instructions into a computer-readable signal (not shown) which is transmitted via a wireless (or wired) interface (for example via the Internet) to the server 300. In such an embodiment, the computer-readable signal is one type of a non-tangible computer-readable medium.

Figure 7B:
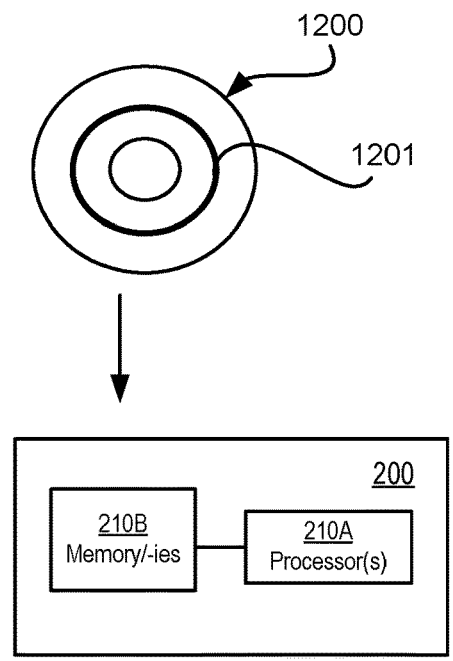

FIG. 7b shows an example of a non-transitory computer-readable medium, in this example in the form of a data disc 1200. In some embodiments, the data disc 1200 is a magnetic data storage disc. The data disc 1200 is configured to carry instructions 1201 that when loaded into memory 210B of an electronic device and executed by the processor(s) 210A of the electronic device 200, cause the electronic device 200 to perform a method or procedure as disclosed herein (e.g., the method 5000, FIG. 5). The data disc 1200 is arranged to be connected to or within and read by a reading device (not shown), for loading the instructions into the electronic device 200. One such example of a reading device in combination with one (or several) data disc(s) 1200 is a hard drive. It should be noted that the computer-readable medium can also be other mediums such as compact discs, digital video discs, flash memories or other memory technologies commonly used. In such an embodiment the data disc 1200 is one type of a tangible computer-readable medium. The instructions may alternatively be downloaded to a non-transitory computer-readable medium in the memory 210B, by modulating the instructions in a computer-readable signal (not shown) which is transmitted via a wireless (or wired) interface (for example via the Internet) to the electronic device 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Moreover, terms "first", "second", etc. do not exclude the presence of performing the actions or arranging devices in an alternative order. Instead, these terms are applied in order to refer to different actions, devices, units, etc. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method comprising, at a server having one or more processors and memory storing instructions for execution by the one or more processors:
   obtaining a playlist that comprises a plurality of audio items;
   dividing the playlist into a plurality of coherent groups, wherein each coherent group of the plurality of coherent groups comprises a respective sequence of audio items of the plurality of audio items with a common attribute;
   for a respective coherent group of the plurality of coherent groups, creating the respective coherent group by:
   i. determining a parameter value of a first audio item of the respective sequence;
   ii. adjusting a parameter value of a second audio item of the respective sequence based on the determined parameter value of the first audio item, to form a transition between the first and second audio items, wherein the first and second audio items are adjacent in the respective sequence; and iii. forming a single coherent-group audio item comprising sequential audio items, including a combination of the first audio item, the transition, and the second audio item;

creating a first coherent group by performing operations i, ii, and iii;

providing the first coherent-group audio item to a second electronic device for playback;

after providing the first coherent-group audio item to the second electronic device for playback, receiving, from the second electronic device, an indication of user input indicating a first additional audio item that is to be added to the playlist after the first coherent group of the plurality of coherent groups;

before generating a second coherent-group audio item for the second coherent group, providing the first additional audio item to the second electronic device; and after providing the first additional audio item to the second electronic device, generating the second coherent-group audio item for the second coherent group, wherein generating the second coherent-group audio item includes:

creating the second coherent group by performing operations i, ii, and iii; and providing the second coherent-group audio item to the second electronic device for playback.

2. The method of claim 1, wherein the respective sequence of the respective coherent group comprises multiple successive pairs of audio items, the method further comprising, at the server:

for each successive pair of the multiple successive pairs:
determining a parameter value associated with one audio item of the successive pair; and
adjusting a parameter value of another audio item of the successive pair based on the determined parameter value of the one audio item, to form a transition for the successive pair;
wherein forming the coherent-group audio item comprises combining the multiple successive pairs and their respective transitions into the coherent-group audio item.

3. The method of claim 1, wherein providing the first coherent-group audio item to the second electronic device comprises sending a location where the first coherent-group audio item is stored to the second electronic device.

4. The method of claim 1, wherein:
the server includes storage; and
obtaining the playlist comprises retrieving the playlist from the storage.

5. The method of claim 1, wherein obtaining the playlist comprises receiving the playlist from the second electronic device.

6. The method of claim 1, wherein:
determining the parameter value of the first audio item comprises analyzing a portion of the first audio item; and
adjusting the parameter value of the second audio item comprises adjusting a portion of the second audio item.

7. The method of claim 6, wherein:
the first audio item precedes the second audio item in the respective sequence;
analyzing the portion of the first audio item comprises analyzing a final portion of the first audio item; and adjusting the portion of the second audio item comprises adjusting an initial portion of the second audio item.

8. The method of claim 6, wherein:
the first audio item follows the second audio item in the respective sequence;
analyzing the portion of the first audio item comprises analyzing an initial portion of the first audio item; and
adjusting the portion of the second audio item comprises adjusting a final portion of the second audio item.

9. The method of claim 1, further comprising, at the server and for the respective coherent group:
before adjusting the parameter value of the second audio item, determining a parameter value of the second audio item; and
adjusting the parameter value of the first audio item based on the determined parameter value of the second audio item, to form the transition;
wherein the transition is based on the adjusted parameter values of the first and second audio items.

10. The method of claim 1, wherein:
the parameter values of the first and second audio items relate to playback tempos; and
adjusting the parameter value of the second audio item comprises adjusting a playback tempo of at least a portion of the second audio item.

11. The method of claim 1, wherein:
the parameter values of the first and second audio items relate to playback volumes; and
adjusting the parameter value of the second audio item comprises adjusting a playback volume of at least a portion of the second audio item.

12. The method of claim 1, wherein the parameter values of the first and second audio items are values of a parameter selected from the group consisting of playback volume, playback tempo, equalizer settings, playback speed, playback style, reverb, echo, delay, sound effects, fillers, and bumpers.

13. The method of claim 1, wherein adjusting the parameter value of the second audio item is performed in accordance with a transition rule.

14. The method of claim 1, wherein a second additional audio item is added to the playlist based on a history of audio items previously provided to the second electronic device.

15. A server, comprising:
one or more processors; and
memory storing one or more programs for execution by the one or more processors, the one or more programs including instructions for:
obtaining a playlist that comprises a plurality of audio items;
dividing the playlist into a plurality of coherent groups, wherein each coherent group of the plurality of coherent groups comprises a respective sequence of audio items of the plurality of audio items with a common attribute;
for a respective coherent group of the plurality of coherent groups, creating the respective coherent group by:
i. determining a parameter value of a first audio item of the respective sequence,
ii. adjusting a parameter value of a second audio item of the respective sequence based on the determined parameter value of the first audio item, to form a transition between the first and second audio items, wherein the first and second audio items are adjacent in the respective sequence; and iii. forming a single coherent-group audio item comprising sequential audio items, including a combination of the first audio item, the transition, and the second audio item;

creating a first coherent group by performing operations i, ii, and iii;

providing the first coherent-group audio item to a second electronic device for playback;

after providing the first coherent-group item to the second electronic device for playback, receiving, from the second electronic device, an indication of user input indicating a first additional audio item that is to be added to the playlist after the first coherent group of the plurality of coherent groups;

before generating a second coherent-group audio item for the second coherent group, providing the first additional audio item to the second electronic device; and after providing the first additional audio item to the second electronic device, generating the second coherent-group audio item for the second coherent group, wherein generating the second coherent-group audio item includes:

creating a respective coherent group by performing operations i, ii, and iii; and providing the second coherent-group audio item to the second electronic device for playback.

16. A non-transitory computer-readable storage medium storing one or more programs for execution by one or more processors of a server, the one or more programs including instructions for:

obtaining a playlist that comprises a plurality of audio items;

dividing the playlist into a plurality of coherent groups, wherein each coherent group of the plurality of coherent groups comprises a respective sequence of audio items of the plurality of audio items with a common attribute;

for a respective coherent group of the plurality of coherent groups, creating the respective coherent group by:

i. determining a parameter value of a first audio item of the respective sequence;

ii. adjusting a parameter value of a second audio item of the respective sequence based on the determined parameter value of the first audio item, to form a transition between the first and second audio items, wherein the first and second audio items are adjacent in the respective sequence; and iii. forming a single coherent-group audio item comprising sequential audio items, including a combination of the first audio item, the transition, and the second audio item;

creating a first coherent group by performing operations i, ii, and iii;

providing the first coherent-group audio item to a second electronic device for playback;

after providing the first coherent-group audio item to the second electronic device for playback, receiving, from the second electronic device, an indication of user input indicating a first additional audio item that is to be added to the playlist after the first coherent group of the plurality of coherent groups;

before generating a second coherent-group audio item for the second coherent group, providing the first additional audio item to the second electronic device; and after providing the first additional audio item to the second electronic device, generating the second coherent-group audio item for the second coherent group, wherein generating the second coherent-group audio item includes:

creating a respective coherent group by performing operations i, ii, and iii; and providing the second coherent-group audio item to the second electronic device for playback.

* * * * *

UNITED STATES PATENT AND TRADEMARK OFFICE
CERTIFICATE OF CORRECTION

PATENT NO.         : 10,229,716 B2                                      Page 1 of 1
APPLICATION NO.    : 15/399594
DATED              : March 12, 2019
INVENTOR(S)        : Jehan et al.

It is certified that error appears in the above-identified patent and that said Letters Patent is hereby corrected as shown below:

On the Title Page

Item (72) Inventors, Line 2, please delete "Frej Connoly" and insert --Frej Connolly--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*